United States Patent [19]
McCue

[11] 3,758,858
[45] Sept. 11, 1973

[54] ELECTRONIC TACHOMETER
[75] Inventor: David D. McCue, Hamburg, N.Y.
[73] Assignee: Frank A. Roberts, Grand Island, N.Y.
[22] Filed: June 5, 1970
[21] Appl. No.: 43,779

[52] U.S. Cl. ................. 324/166, 324/78 J, 324/115
[51] Int. Cl. ............................................ G01p 3/48
[58] Field of Search .................... 324/163, 164, 165, 324/166, 168, 169, 170, 171, 173, 174, 175, 78 J, 78 E, 115

[56] References Cited
UNITED STATES PATENTS

| | | | |
|---|---|---|---|
| 3,441,943 | 4/1969 | McCue | 324/171 |
| 2,513,668 | 7/1950 | Parker | 324/78 E |
| 3,187,323 | 6/1965 | Flood | 324/115 |
| 2,512,330 | 6/1950 | Hendrich | 324/166 |
| 2,999,168 | 9/1961 | Henry | 324/166 |
| 2,870,408 | 1/1959 | Draganjac | 324/115 |

Primary Examiner—Michael J. Lynch
Attorney—Bean & Bean

[57] ABSTRACT

An electronic tachometer is provided in which the frequency of charge transfer to a capacitor is proportional to the RPM being measured. The d.c. level proportional to the frequency of charge transfer is applied to an amplifier having a feedback resistance and whose output drives a d.c. meter having a number of scales calibrated in RPM. When the meter needle reaches the end of one scale, the value of feedback resistance for the amplifier is suddenly decreased by the effect of a switching circuit responsive to current flowing in the feedback path, thereby to decrease the amplifier output suddenly so as to swing the meter needle to the low end of the next RPM range scale. An amplifier operating at substantially full open loop gain for low values of input signal and having clipped output for higher values of input signal is used to enable meaningful output from a magnetic transducer at low RPM of the device being measured. A dual diode pump having low average supply current requirements is also disclosed.

14 Claims, 6 Drawing Figures

3,758,858

INVENTOR
DAVID D. McCUE

Bean & Bean
ATTORNEYS

INVENTOR
DAVID D. McCUE

Bean & Bean
ATTORNEYS

INVENTOR
DAVID D. McCUE

Bean & Bean
ATTORNEYS 3,758,858

ELECTRONIC TACHOMETER

BACKGROUND OF THE INVENTION

In measuring the speed of vehicles such as locomotives, a convenient way to do so is to determine the RPM of one of its wheels. In a locomotive, a signal proportional to the RPM of a wheel and accordingly the speed of the vehicle may be picked up by a magnetic transducer. The RPM may vary over a wide range so that if a single scale instrument is used, the scale readings may be relatively coarse in order to accommodate the full range within the finite scale length involved.

Moreover, magnetic transducers produce very weak output signals at low relative speed between the transducer members and relatively large signals when the speed or RPM is high.

BRIEF SUMMARY OF THE INVENTION

The present invention is directed first of all to an electric tachometer having the capability for automatically switching between several RPM ranges so that for a finite sweep of an indicating needle or the like the effective total length of the scale may be increased, thereby giving more accurate and more easily readable indications.

The tachometer according to this invention operates in conjunction with a dual diode pump and an output or storage capacitor thereof which receives current charge transfer at a rate proportional to the RPM being measured and a d.c. level signal also proportional to the RPM measured is employed as the input to an amplifier whose output drives the indicating device such as a d.c. meter. The amplifier is provided with a feedback resistance path for a positive current intended exactly to equal the rate of negative charge transfer to the aforementioned output capacitor which controls one or more switching circuits whose purpose is suddenly to decrease the resistance value of the feedback path when the positive current rate reaches a predetermined value or values correspondingly to reduce the output of the amplifier and therefore allow the indicator needle to swing from the high end of one scale to the low end of the next scale.

DETAILED DESCRIPTION OF THE INVENTION

Figure 1:
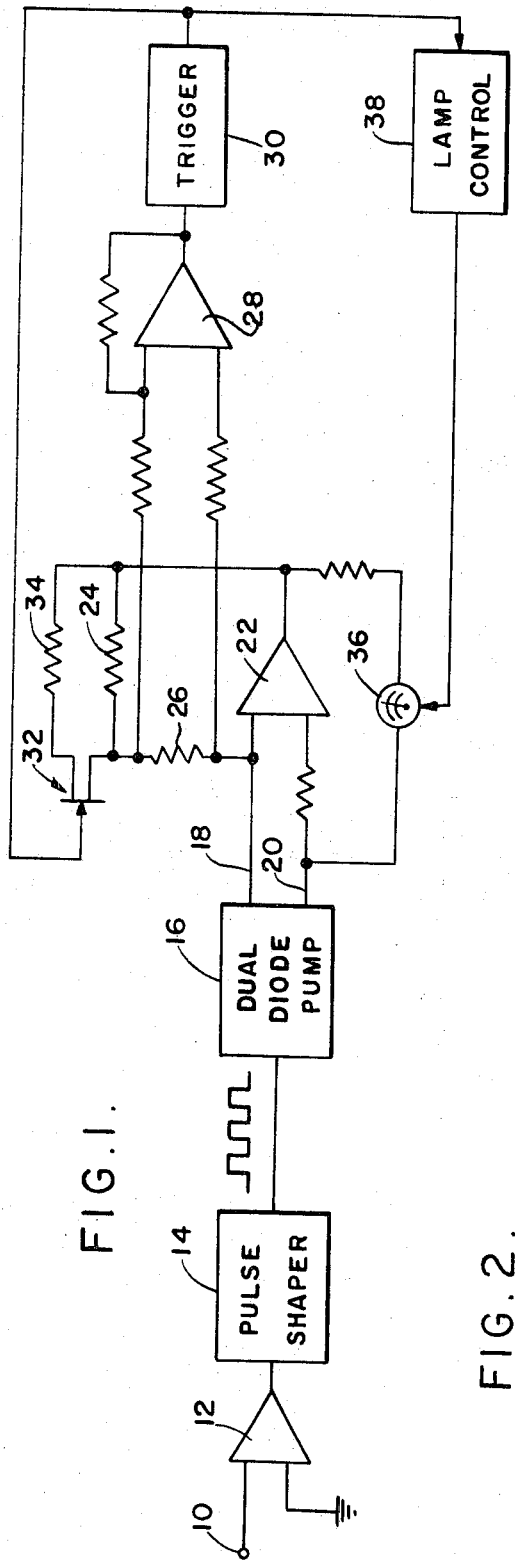
FIG. 1 is a diagram illustrating a system according to the present invention.

The general arrangement is illustrated diagrammatically in FIG. 1 in which a system particularly well adapted to provide multi-range tachometer readings from a signal source which may, at low RPM, produce a weak signal. For example, the system is well adapted to provide RPM readings from a magnetic transducer in which a sinusoidal voltage is produced whose amplitude varies with RPM and/or proximity, such as the transducer as described in copending application Ser. No. 687,589, filed Dec. 4, 1967.

This signal is applied to the terminal 10 and is passed to the amplifier 12 having special characteristics as set forth hereinafter. After amplification, the signal is applied to a pulse shaping circuit 14 to produce the square wave output as shown, whose frequency is proportional to the speed or RPM being measured and whose amplitude is limited as will hereinafter appear. The square wave signal is passed to a dual diode pump circuit 16 which produces an analog output across the conductors 18 and 20 which is proportional to the frequency of the square wave signal and hence to the speed or RPM being measured.

This analog signal is applied to an amplifier 22 described hereinafter with the effect that current flows through the resistors 24 and 26 at a rate equal to the rate of charge transfer to the storage capacitor of the dual diode pump 16. When this current reaches a predetermined value corresponding to some established value of the frequency of the input at the terminal 10, the voltage across the resistor 26, as amplified at 28, actuates the trigger circuit 30 gating the field effect transistor 32 to full conduction. Under these conditions, the resistor 34 is placed in parallel with the resistor 24 so that the output of the amplifier 22 drops suddenly.

The meter 36 is connected across the output of the amplifier 22 and, under the circumstances outlined above, this meter is read along one scale during the time in which the FET 32 is not conducting and along another scale during the time the FET 32 is conducting, these two scales being calibrated according to the corresponding RPM ranges.

Each scale is illuminated so as to avoid ambiguity with respect to the identity of the scale which should be read and a control 38 is provided so as to cause illumination of the proper scale.

It will be appreciated that further trigger circuits may be provided in conjunction with further FET devices to establish, through further resistors in parallel with the resistors 24 and 34, as many more RPM ranges as may be desired. Each trigger circuit, of course, establishes the cut-off point for the high end of the scale being read and causes the output of the amplifier 22 to decrease rapidly so that the meter pointer drops to the low end of the next scale, and so on for each succeeding range.

Figure 2:
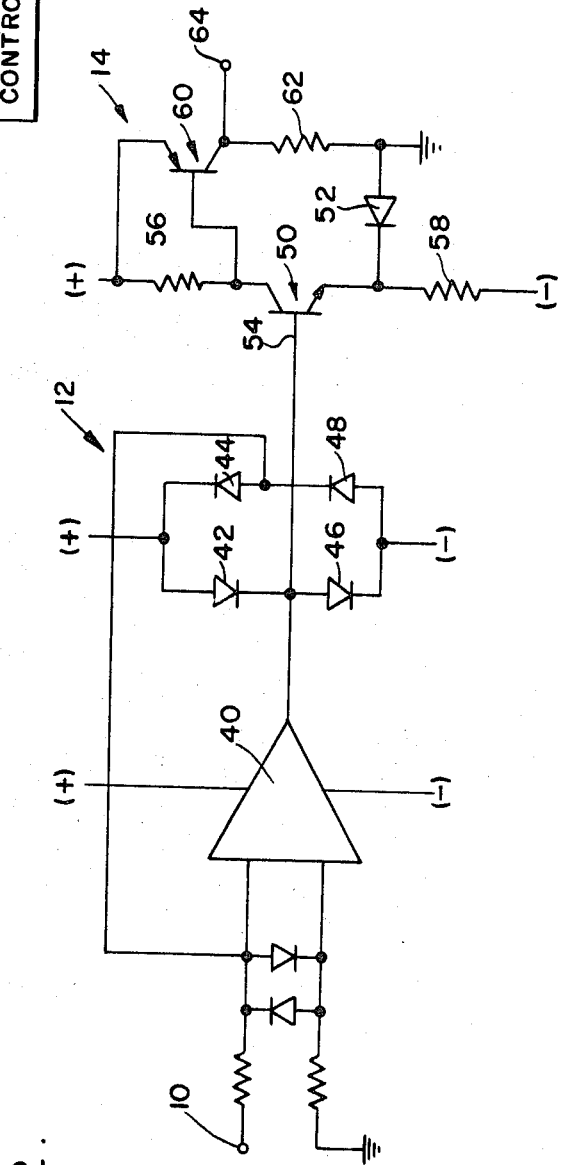
FIG. 2 is a circuit diagram of the amplifying and wave shaping circuits for the input signal.

The amplifier 12, as discussed above, desirably is of such form as will respond to very weak signals such as may emanate from a magnetic pick-up at low RPM. FIG. 2 illustrates such an amplifier and also illustrates the pulse shaping circuit 14.

In FIG. 2, a conventional high gain amplifier 40 is connected such that for very small input signals its feedback path is blocked by the offset voltage of a pair of diodes 42, 44 or 46, 48 so that the amplifier operates at substantially full open loop gain until the output signal reaches the level of two diode drops above ground, at which time the output feeds back to the input so that the output effectively is clipped. Thus, for inputs of the character described wherein the input signal strength varies greatly, the high open loop gain characteristics provide adequate output signals at low values of RPM being measured whereas the output signal is limited in amplitude when the input signal becomes large due to increase in the RPM being measured. For positive going input signals, the feedback is through the diodes 46 and 48, whereas for negative going inputs, the feedback is through the diodes 42 and 44.

The wave shaping circuit 14 is also conducive to the problems peculiar to the nature of the input signal at the conductor 10. The transistor 50 is provided with a biasing diode 52 which assures that this transistor is near conduction when the base electrode 54 is at ground potential. By using a value for the resistor 56 greater than the value of the resistor 58, the transistor 50 will conduct for very small positive voltages at its base electrode which, in turn, will cause the transistor 60 to saturate very rapidly since its emitter-base section is connected across the resistor 56. Consequently, an excellent square wave form appears across the load resistor 62 at the output terminal 64, which wave form is particularly suitable for the dual diode pump circuit illustrated in FIG. 3.

Figure 3:
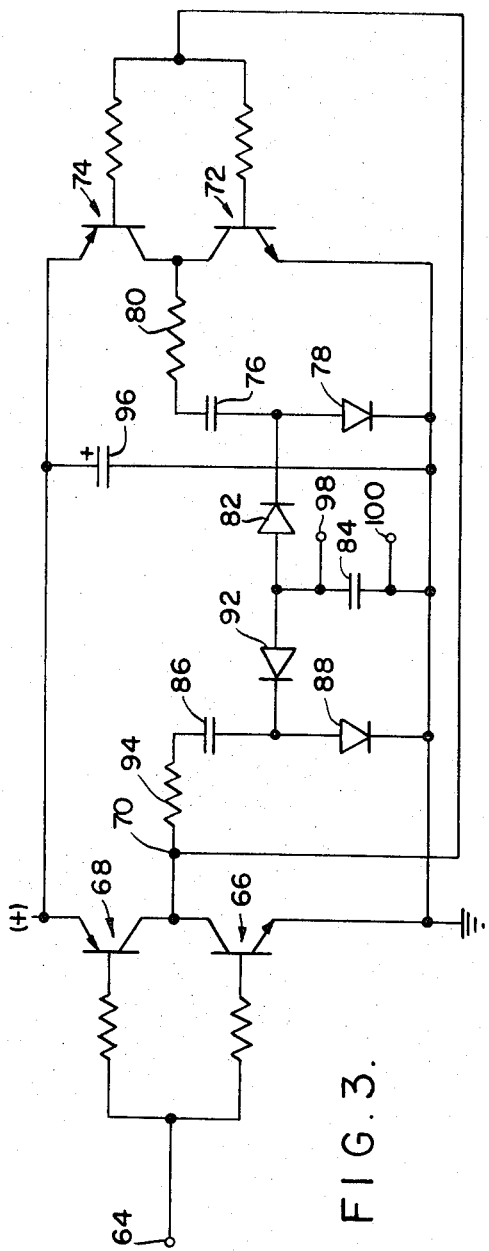
FIG. 3 is a circuit diagram of the dual diode pump circuit.

The diode pump circuit of FIG. 3 is of unusual properties in itself, in that it is so constructed that very little average supply current is required to operate this circuit. When no square wave pulse is present at the terminal 64, the transistor 68 is forward biased so that the junction 70 is at positive potential which also forward biases the transistor 72. Thus, both of these transistors may conduct collector current at this time whereas the transistors 66 and 74 are cut off. The transistor 68 thus supplies charging current for the capacitor 86 through the transistor 94 and the diode 88, which current demand is of small time magnitude due to the small time constant of the circuit elements 86, 94. Thereafter, the only current drain from the supply is the relatively small base current drain of the transistor 72 which is conducting collector current to transfer the charge on the capacitor 76 through the diode 82 and resistor 80 to the output capacitor 84. When, on the other hand, the square wave input is at the terminal 64, the transistor 66 is caused to conduct heavily whereas the transistor 68 is cut off. The junction 70 goes toward ground potential cutting off the transistor 72 and causing the transistor 74 to conduct. The capacitor 76 charges very rapidly through the diode 78 and the transistor 74 due to the small time constant of the RC circuit 76, 80. When the square wave terminates, the capacitor 76 transfers its charge through the diode 82 and the transistor 72 to the output capacitor 84. At the same time, the capacitor 86 charges rapidly through the diode 88 and the transistor 68 so that, as beofre, very little average current drain is imposed upon the supply at 90. During the square wave input at 64, the capacitor 86 of course transfers its charge to the output capacitor 84 via the diode 92 and the transistor 66. The resistor 94 corresponds to the resistor 80 and, like it, allows very rapid charging and discharging of the associated capacitor. The storage capacitor 96 assures that the charging times of the capacitors 76 and 86 remain very low by maintaining the supply potential. Conventional pump diodes utilize resistors in place of the transistors 68 and 74 of FIG. 3 so that during the entire time interval during which no pulse is present at the input 64, the transistor 72 would be heavily conducting collector current to drain the supply and, during the entire pulse interval, the transistor 66 would be heavily conducting collector current. In contrast to a conventional circuit, the circuit of FIG. 3 produces appreciable drain on the supply only for those short time periods necessary to charge the capacitors 76 and 86 and these times will be very much less than the pulse and no-pulse intervals respectively.

The output across the output capacitor 84 is at the terminals 98 and 100 and will be seen to be a ramp signal proportional to the RPM producing the input signal at the terminal 10, FIG. 1. The capacitor 84 receives negative charge from the capacitors 76 and 86 at each zero crossing of the input A.C. signal at the terminal 10 and the positive current through the resistors 24, 26, 102 and 104 of FIG. 4 tends to be exactly equal to the rate of negative charge transfer to the capacitor 84. If the negative charge rate received by the capacitor 84 increases due to increased input frequency at the terminal 10, a net negative signal is applied to the amplifier 106 causing its voltage output to increase according to the ratio of the values of the resistors 24, 26 to the values of the resistors 102, 104 thereby to maintain the required positive current.

Since the response of the amplifier 106 may be expected to be in the order of microseconds, the use of the integrating capacitor 108 at the midpoint of the input resistance (i.e., the values of resistors 102 and 104 are the same) provides a bypass for the A.C. portion of the ramp signal so as to produce a d.c. value at the output terminal 110 of the amplifier 106 to drive the meter 36 or similar device.

As described in conjunction with FIG. 1, when the voltage drop across the resistor 26 reaches a predetermined value at which the needle of the meter reaches the end of one scale, the trigger 30 gates the field effect transistor 32 into full conduction thereby reducing the output voltage of the amplifier 106 and causing the meter needle to swing to the low end of the next RPM calibrated scale.

Figure 4:
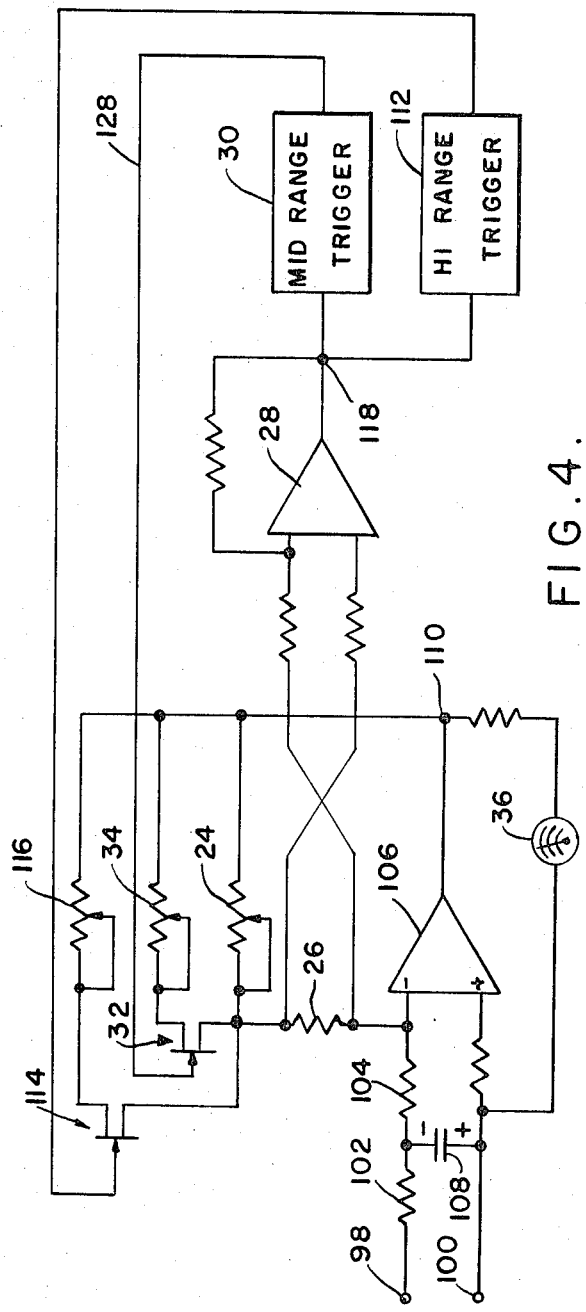
FIG. 4 is a circuit diagram of the feedback amplifier driven by the diode pump circuit of FIG. 3 and diagrammatically illustrating the trigger circuits associated therewith.

In FIG. 4, a further trigger 112 and associated field effect transistor 114 with associated resistor 116 is included for a third meter range change.

Figure 5:
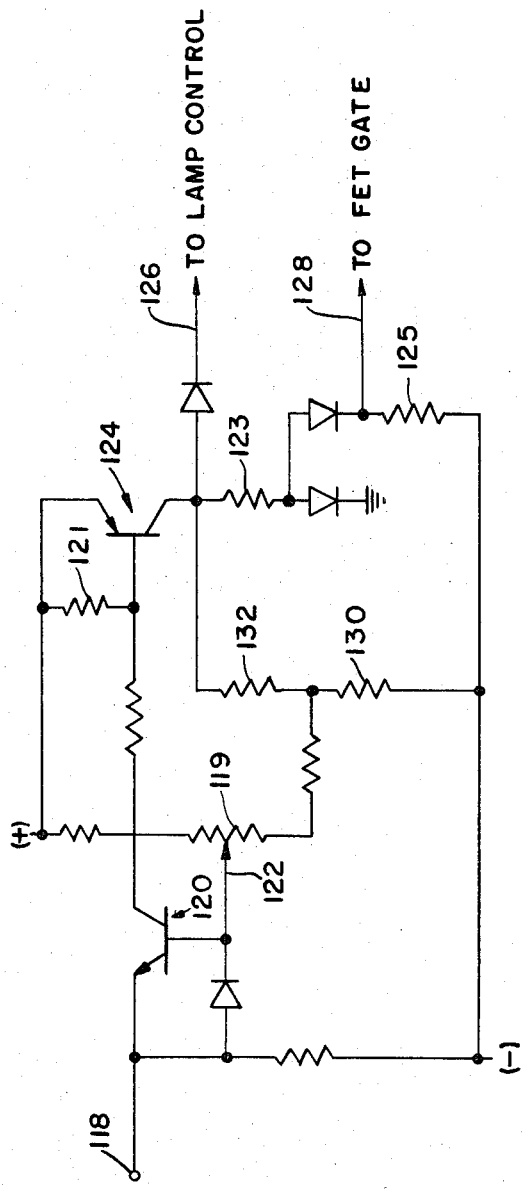
FIG. 5 is a circuit diagram of one of the trigger circuits.

From the above description of FIG. 4, it will be apparent that the current through the resistor 26, and consequently the voltage drop thereacross, is proportional to the frequency of the input signal at the terminal 10, FIG. 1. Since the input to the amplifier 28 is across this resistor, as shown, the voltage output at the junction point 118 is inversely proportional to the input signal frequency. The trigger circuits are driven by this latter voltage output and, as shown in FIG. 5, each such trigger circuit includes a transistor 120 having its emitter connected to the junction point 118 and the voltage on its base electrode is set to some fixed value by adjustment of the movable tap 122 to establish the desired voltage value along the resistor 119 to prevent forward biasing of the transistor 120 until the voltage at the point 118 has depressed, relative to this fixed value, to that value corresponding to the switching threshold for the r.p.m. range in question. As soon as the transistor 120 is switched on, the voltage drop across the resistor 121 forward biases the transistor 124 so that it conducts collector current through the lamp control load resistor 123 and the FET gate resistor 125 and, as well, through the resistor chain 130, 132. This latter resistor chain is provided to provide a small hysterisis to prevent instability at the threshold of switching. For this purpose, the value of the resistor 130 which is also in the voltage divider chain associated with the movable tap 122, is small compared with the value of the resistor 132. In this manner, the bias voltage on the base electrode of the transistor 120 is increased slightly when the transistors 120 and 124 are switched on.

Figure 6:
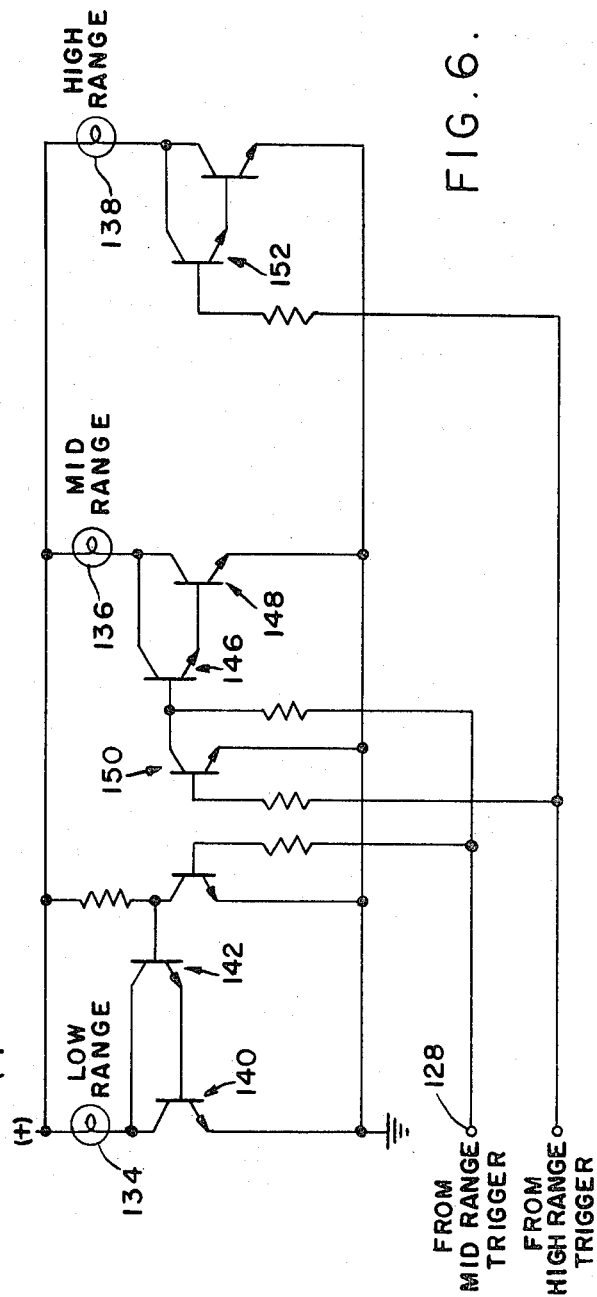
FIG. 6 is a circuit diagram of the lamp driver circuits.

The lamp control circuit is shown in FIG. 6. Each of the three RPM calibrated scales of the meter 36 is illuminated at the appropriate time by the low, mid and high range lamps 134, 136 and 138, respectively. Before either of the triggers 30 or 112 are operated, the normal conducting states of the transistors 140 and 142 allows the lamp 134 to illuminate. As soon as a signal arrives from the mid-range trigger 30, the transistor 144 conducts and cuts off the transistors 142 and 140. At the same time, the transistor 146 conducts to cause conduction of the transistor 148 and energization of the mid-range lamp 136. Similarly, a signal from the high range trigger 112 causes the transistors 150 and 152 to conduct, extinguishing the mid-range lamp 136 and energizing the high range lamp 138.

I claim:

1. An electronic tachometer comprising, in combination,
   first means for demanding current at a rate proportional to RPM being measured;
   feedback amplifier means having said first means as the input thereto and having an output, and having a feedback path from its output to its input including load means for passing the current demanded by said first means;
   measuring means having at least two successive indicating ranges for the RPM being measured, said measuring means being driven by the output of said feedback amplifier means;
   said feedback path having a first portion in series with said load means for accommodating only one range of said measuring means, and a second portion adapted to be connected to said first branch for accommodating the next successive range of said measuring means; and
   control means connected across said load means for abruptly connecting said second portion to said first portion in response to a signal generated by said load means corresponding to the end of said one range of the measuring means.

2. The electronic tachometer defined in claim 1 wherein said first means comrises a capacitor and means for transferring current to said capacitor at a rate proportional to the RPM being measured.

3. The electronic tachometer as defined in claim 2 wherein said control means comprises a field effect transistor for connecting said second portion to said first portion, and trigger means having an output for gating said field effect transistor.

4. The electronic tachometer as defined in claim 3 wherein said first and second portions are connected in parallel by said field effect transistor, each portion comprising a feedback resistor.

5. The electronic tachometer as defined in claim 4 including an indicating lamp for each of said ranges of the measuring means, and interlock means connected to the output of said trigger means for controlling said lamps in accord with the range being measured.

6. An electronic tachometer comprising, in combination:
   means for producing a pulse output whose frequency is proportional to rotational speed being measured;
   capacitive charge transfer means for demanding current in proportion to the frequency of said pulse output;
   a feedback amplifier having said charge transfer means as its input and having an output including measuring means having at least two successive indicating ranges for the RPM being measured, and said amplifier having a feedback path for supplying the current demanded by said charge transfer means and including load resistor means through which the demanded current passes; and
   control means connected across said load resistor means for sharply reducing the resistance of said feedback path in response to predetermined voltage drop across said load resistor means whereby abruptly to decrease the output of said amplifier to switch range on said measuring means.

7. The electronic tachometer as defined in claim 6 wherein said control means includes a field effect transistor and trigger means for gating said field effect transistor.

8. The electronic tachometer as defined in claim 7 wherein said feedback path includes first and second resistance branches connected in parallel by said field effect transistor.

9. The electronic tachometer as defined in claim 8 including an indicating lamp for each of said ranges of the measuring means, and interlock means for controlling said lamps in accord with the range being measured.

10. An electronic tachometer system, comprising in combination:
    means for producing a pulse output whose frequency is proportional to the speed of a device being measured;
    means comprising a dual diode pump for providing a d.c. signal proportional to the frequency of said pulses;
    an amplifier having said signal as an input thereto and having an output including an indicating instrument provided with a plurality of indicating scales thereon and an indicator for successively sweeping said scales, the sweep movement being substantially identical for each of the scales;
    said amplifier having a feedback resistance path for determining the output level of the amplifier; and
    means for sharply reducing the resistance of said feedback path in response to a predetermined output of the amplifier whereby the indicator will move from the high end of one scale to the lower end of another scale thereof;
    said means for sharply reducing the feedback resistance comprising switch means for inserting a resistor in parallel with a portion of said feedback path and trigger means responsive to current flowing through another portion of said feedback path for actuating said switch means.

11. The system as defined in claim 10 wherein said scales are provided with individual illuminating lamps and said trigger means controls operation of said lamps selectively to illuminate the scale under consideration.

12. An electronic tachometer system, comprising in combination:
    means for producing a pulse output whose frequency is proportional to the speed of a device being measured;
    means for providing a d.c. signal proportional to the frequency of said pulses;
    an amplifier having said signal as an input thereto and having an output including an indicating instrument provided with a plurality of indicating scales thereon and an indicator for successively sweeping said scales, the sweep movement being substantially identical for each of the scales;

said amplifier having a feedback resistance path for determining the output level of the amplifier; and means for sharply reducing the resistance of said feedback path in response to a predetermined output of the amplifier whereby the indicator will move from the high end of one scale to the lower end of another scale thereof;

said means for sharply reducing the feedback resistance comprising switch means for inserting a resistor in parallel with a portion of said feedback path and trigger means responsive to current flowing through another portion of said feedback path for actuating said switch means.

13. An electronic tachometer system, comprising in combination:

means for producing a pulse output whose frequency is proportional to the speed of a device being measured;

means for providing a d.c. signal proportional to the frequency of said pulses;

an amplifier having said signal as an input thereto and having an output including an indicating instrument provided with a plurality of indicating scales thereon and an indicator for successively sweeping said scales, the sweep movement being substantially identical for each of the scales;

said amplifier having a feedback resistance path for determining the output level of the amplifier; and means for sharply reducing the resistance of said feedback path in response to a predetermined output of the amplifier whereby the indicator will move from the high end of one scale to the lower end of another scale thereof;

said means for providing a d.c. signal comprising a dual diode pump having two pairs of complemental transistors, biasing means, said transistors of each pair having their emitter-collector paths in series and the emitter-collector paths of the two pairs being connected in parallel across said biasing means, means for applying said pulse output to the base electrodes of one pair of said transistors, the emitter-collector paths of said one pair being arranged to cause one transistor of such pair to conduct while the other is cut off during each pulse output and vice versa for interpulse periods, a first capacitor connected through the emitter-collector path of said one transistor to said biasing means when said one transistor conducts, means connecting the base electrodes of the other pair of transistors to said biasing means when said one transistor conducts, the emitter-collector paths of said other pair being arranged to cause one transistor of said other pair to conduct while the other is cut off when said one transistor of said one pair conducts and vice versa when the other transistor of said one pair conducts, a second capacitor adapted to be charged through the other transistor of said other pair, and an output capacitor connected respectively to said first capacitor and said second capacitor through the emitter-collector paths of the other transistor of said one pair and the one transistor of said other pair whereby to have the charges of said first and second capacitors transferred thereto.

14. The system as defined in claim 13 wherein the first mentioned means comprises an amplifier having an output, and a plurality of diodes connected between said output and the input of the amplifier.

* * * * *